3,145,563
PIEZORESISTIVE TRANSDUCER EMPLOYING P-TYPE LEAD TELLURIDE (PbTe) AS THE PIEZORESISTIVE MATERIAL
Lewis E. Hollander, Jr., Los Altos Hills, Calif., assignor to Lockheed Aircraft Corporation, Burbank, Calif.
Filed Apr. 11, 1960, Ser. No. 21,308
5 Claims. (Cl. 73—134)

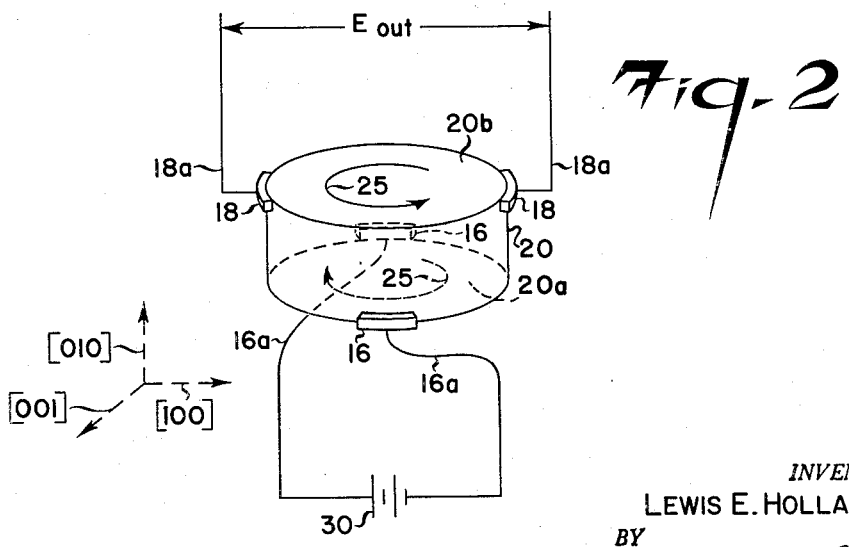

This invention relates generally to piezoresistive transducers, and more particularly to piezoresistive transducers employing single crystal p-type lead telluride (PbTe) as the piezoresistive material.

It is well known that the piezoresistive effect offers important advantages for transducer applications, such as low impedance, high sensitivity and wide dynamic range. The piezoresistive effect, which is the basis of operation of these transducers, appears as a change in the resistivity of a material in response to an applied stress, which is independent of any contribution from dimensional changes. Because it is practically impossible to predict which materials will exhibit the piezoresistive effect to any significant extent, only a relatively small number of materials have been found which are useable for transducer applications, these materials being germanium, silicon, indium antimonide, the barium strontium titanate ceramics, and oxygen-deficient rutile. The characteristics of the piezoresistive effect in germanium, silicon, indium antimonide and the barium strontium titanate ceramics have already been reported in the published literature and the piezoresistive characteristics of oxygen-deficient rutile are described in my copending patent application Serial No. 855,042, filed November 24, 1959, now Patent No. 3,121,-337.

I have discovered another material which exhibits a very considerable piezoresistive effect and offers advantages for transducer applications not provided by the previously mentioned materials. This newly discovered material is single-crystal p-type lead telluride which is particularly advantageous in that its very large piezoresistive shear coefficient makes it ideally suited for use as a shear strain transducer. In fact, its piezoresistive shear coefficient is considerably larger than exhibited by any of the other above-mentioned piezoresistive materials.

Accordingly, it is an object of this invention to provide a new type of piezoresistive transducer.

Another object of this invention is to provide piezoresistive transducers employing single-crystal p-type lead telluride as the piezoresistive material.

A further object of this invention is to provide an improved and simplified transducer for directly measuring shear strain.

Still another object of this invention is to provide a piezoresistive transducer which directly provides a voltage output signal proportional to the shear forces applied thereto.

Yet another object of this invention is to provide a piezoresistive transducer for directly measuring torsion.

The specific nature of the invention as well as other objects, uses and advantages thereof, will clearly appear from the following description and from the accompanying drawing in which:

FIG. 1 is a schematic perspective view illustrating the configuration of a p-type single crystal PbTe piezoresistive transducer for measuring shear strain in accordance with the invention.

FIG. 2 is a schematic perspective view illustrating another configuration of a p-type single crystal PbTe transducer for measuring torsion in accordance with the invention.

Like numerals designate like elements throughout the figures of the drawing.

Lead telluride (PbTe) is a semiconductor which crysallizes in a cubic structure of the NaCl type. Measurements on single crystal PbTe have revealed that p-type PbTe for a wide range of carrier concentrations exhibits a large positive piezoresistive effect which on an overall basis is greater than in germanium, silicon, or indium antimonide and almost as large as in the barium strontium titanate ceramics. In regard to the piezoresistive shear coefficient, however, the shear coefficient for single crystal p-type PbTe is very much greater than that of any of the other piezoresistive materials which have been discovered. It is possible, therefore, to employ single crystal PbTe not only for applications involving longitudinal piezoresistive strain measurements (as illustrated in the previously mentioned copending application for oxygen-deficient rutile), but also, for providing a greatly simplified shear-strain transducer which is capable of measuring shear directly with a high sensitivity.

FIG. 1 shows one type of configuration which may be employed for directly measuring shear by means of a transducer employing single crystal p-type PbTe as the piezoresistive material. In FIG. 1, a thin rectangular slab 10 of single crystal p-type PbTe is provided with one of its three crystal axes in a generally longitudinal direction perpendicular to the faces 10a of the slab 10, and another of its crystal axes perpendicular to the faces 10b of the slab 10. The dashed arrows at right angles in FIG. 1 indicate one possibility of crystal orientation with the crystal axis perpendicular to the faces 10a in the [100] crystallographic direction and the crystal axis perpendicular to the faces 10b in the [010] crystallographic direction. It will be evident to those skilled in the art that any other combination of the crystallographic directions [100], [010] and [001] for the crystal axes would be equivalent because of the cubic symmetry of the PbTe crystal.

Centrally located on the faces 10a of the slab 10 are electrodes 16 to which a source of voltage indicated by the battery 30 is connected by means of lead wires 16a. An A.-C. source may also be employed if so desired. The electrodes 16 and the lead wires 16a connected thereto may be provided in any well known manner. The voltage across the electrodes 16 sets up a voltage gradient between the faces 10a of the slab 10. Because of the relatively low resistivity of p-type PbTe, the voltage 30 may be relatively small of the order of 10–100 millivolts.

On the faces 10b of the slab 10 are provided electrodes 18 which serve as the output electrodes of the device. These electrodes 18 are preferably located at points of equal voltage on the faces 10b so that initially, with no external forces applied, the output voltage $E_{out}$ across the lead wires 18a connected to the electrodes 18 is zero. If points of equal voltage are not chosen, an initial voltage would exist which could serve as a bias for a following stage or be balanced out. Usually, the electrodes 18 are located somewhere in the vicinity of the center of the faces 10b.

If shear forces are now applied to the slab 10 in a direction such as indicated by the arrows 15, the large piezoresistive effect thereby produced will upset the voltage distribution of the slab 10, causing an appreciable voltage $E_{out}$ to be developed across the electrodes 18 having a magnitude proportional to the amount of shear-strain being applied.

The operation of the device of FIG. 1 may perhaps be better understood by considering the four electrodes 16 and 18 as the terminals of an initially balanced bridge circuit, the terminals 16 serving as the power input terminals, the terminals 18 serving as output terminals, and the material between each electrode 16 and 18 serving as the resistive arms of the bridge. It will now be understood that the application of shear forces, such as indicated by the arrows 15, produces changes in the resistivity of the material as a result of piezoresistive action which unbalances the bridge and causes a voltage to appear across the output electrodes 18 having a magnitude proportional to the applied shear forces.

The sensitivity of such a device as indicated in FIG. 1 is very much larger than that of presently known shear strain measuring devices. Also, the output is in the form of a voltage signal which may conveniently be directly fed to suitable means for amplification without the need for external bridge detection circuitry as in conventional piezoresistive transducers and strain gages. If an A.-C. source is employed instead of the battery 30, the shear strain signal will appear as an amplitude modulation of the A.-C. signal from the source which can readily be handled by conventional circuitry.

Various shear-measuring applications for which the device of FIG. 1 may be advantageously employed will no doubt occur to those skilled in the art. For example, the shear forces between two members could be measured by bonding one of the faces 10b of the slab 10 to each member. Or, to measure the shear experienced by a single member, the device of FIG. 1 could be suitably insulated and embedded right inside of the member whose shear is to be measured.

Obviously, the shape of the slab 10 of FIG. 1 and the electrodes 16 and 18 thereon may have a variety of forms and the piezoresistive effect of single crystal p-type PbTe may be employed in a variety of ways. The important criteria for shear strain measurements in order to take full advantage of the large piezoresistive shear coefficient is that a first pair of oppositely disposed electrodes be provided so that a bias voltage field (either A.-C. or D.-C.) is set up in the material in a direction parallel to one crystal axis, and a second pair of oppositely disposed electrodes be provided in a direction parallel to another crystal axis. The specific shape of the material and the specific location of the electrodes are then chosen so that the piezoresistive variations in the material appearing in response to the applied shear forces being measured, results in unbalancing the bridge circuit formed by the electrodes, as described previously. Where a zero initial voltage is desired, the output electrodes should be located at points of equal voltage.

In a typical embodiment of the device of FIG. 1 the p-type single crystal slab 10 is provided by cutting a 2 x 2 x 5 millimeter rectangular slab from a single p-type polycrystalline ingot which is grown from the melt. The slab is cut so that its crystal axes are as shown in FIG. 1, these being determined by inspection of the predominant cleavage planes which generally form along the planes formed by the cubic crystal axes. The resultant single crystal p-type PbTe slab has a carrier concentration in the order of $10^{18}$ per cubic centimeter, a mobility of 700 cm.$^2$/volt-second, and a resistivity of 0.01 ohm-centimeter at 300° Kelvin. The electrodes 16 and 18 are formed on the slab 10 by soldering with indium. After the lead wires 16a and 18a are connected, also by soldering, the slab is ocated with a thin plastic film to provide electrical insulation.

In the above described embodiment, a shear strain of the order of $10^{-3}$ provides an output voltage $E_{out}$ in excess of 25 percent of the input voltage provided by the battery 30. The value of the piezoresistive shear coefficient $\pi_{44}$ is of the order of $250 \times 10^{-12}$ cm.$^2$/dyne, while the longitudinal piezoresistive coefficients $\pi_{11}$ and $\pi_{12}$ are of the order of $80 \times 10^{-12}$ cm.$^2$/dyne and $35 \times 10^{-12}$ cm.$^2$/dyne, respectively.

For the measurement of torsion, which is a particular case of shear, a disk or cylindrically shaped piece 20 of single-crystal p-type PbTe is ordinarily most convenient, such as is shown in FIG. 2. The oppositely disposed electrodes 16 and 18 are then located on the end faces 20a and 20b of the disk 20 at 90° from one another around the periphery of the disk as shown. The solid and dashed arrows 25 represent the applied torsion to be measured, and the dashed arrows [100], [001] and [010] represent the orientation of the crystal axes as in FIG. 1. Operation of the device of FIG. 2 is then the same as the device of FIG. 1, the electrodes 16 and 18 forming a bridge circuit on the disk 20 which is unbalanced in response to applied torsion.

Like the device of FIG. 1, many applications for the device of FIG. 2 will be apparent to those skilled in the art. For example, to measure the torsion between two members, the disk 20 of FIG. 2 could have one of its circular faces bonded to one member and the other circular face to another member. To measure the torsion of a single member, such as a shaft, the disk 20 could be suitably insulated and embedded in the shaft at the location where torsion is being measured.

In employing transducers using single crystal p-type PbTe in accordance with the invention, it should be realized that the resistivity of p-type PbTe is quite small and must ordinarily be taken into consideration in the design of transducers. Also, since both the resistivity and piezoresistivity of p-type PbTe is temperature dependent, operating temperature is also an important consideration. However, these considerations are well within present knowledge and those skilled in the art will have no difficulty in providing many advantageous transducers employing single crystal p-type PbTe in accordance with this invention.

It is to be understood in connection with this invention that many variations and modifications may be made in the invention described herein. The invention, therefore, is to be considered as including all such variations and modifications coming within the scope of the invention as defined in the appended claims.

I claim as my invention:

1. Means for measuring shear strain comprising a piece of single crystal p-type lead telluride, a first pair of oppositely disposed electrodes provided on said piece in a direction substantially parallel to one of the crystal axes thereof, a second pair of oppositely disposed electrodes provided on said piece in a direction substantially parallel to another of the crystal axes thereof, means applying a bias voltage to said first pair of electrodes, said piece and said electrodes thereon being constructed and arranged so that the bridge circuit formed thereby is unbalanced by the piezoresistive variations in said piece appearing in response to the applied shear strain being measured, and means connected to said second pair of electrodes for measuring the change in output voltage appearing thereacross in response to the applied shear strain as a measure thereof.

2. The invention in accordance with claim 1 wherein said second pair of electrodes are located on said piece at points of substantially equal voltage when no external force is applied.

3. Means for measuring shear strain comprising a rectangular slab of single crystal p-type lead telluride material having its face substantially parallel to the crystal axes thereof, a first pair of electrodes provided on a first pair of opposite faces of said slab, means applying a bias voltage to said first pair of electrodes, a second pair of electrodes provided on a second pair of opposite faces of said slab at points of substantially equal voltage when no external force is applied, and means connected to said second pair of electrodes for measuring the output voltage appearing thereacross in response to applied shear forces.

4. Means for measuring torsion comprising a disk-shaped piece of single crystal p-type lead telluride material, a first pair of electrodes oppositely disposed on the periphery of one end face of said disk in a direction substantially parallel to one of the crystal axes thereof, means applying a bias voltage to said first pair of electrodes, a second pair of electrodes oppositely disposed on the periphery of the other end face of said disk in a direction substantially parallel to another of the crystal axes thereof, and means connected to said second pair of electrodes for measuring the change in the output voltage appearing thereacross in response to applied shear forces.

5. The invention in accordance with claim 4 wherein said second pair of electrodes are located on said piece at points of substantially equal voltage when no external force is applied.

References Cited in the file of this patent

UNITED STATES PATENTS

| | | |
|---|---|---|
| 2,614,416 | Hollmann | Oct. 21, 1952 |
| 2,939,317 | Mason | June 7, 1960 |
| 2,953,616 | Pessel et al. | Sept. 20, 1960 |

OTHER REFERENCES

Publication entitled "Piezoresistance Effect in Germanium and Silicon," Physical Review (1954), vol. 94, pages 42–49.

The Proceedings of The Physical Society of London; Section B; vol. 68, Part 1, Jan. 1, 1955, No. 421B; articles by Dr. E. H. Putley, pages 22–42 (pages 22–34 relied on; pages 35–42 for information).